United States Patent [19]
Bengoa

[11] 3,713,224
[45] Jan. 30, 1973

[54] APPARATUS FOR INDICATING THE VOLUME OF MATERIAL IN A VESSEL OR TANK

[76] Inventor: Jose E. Bengoa, P.O. Box 9943, Santurce, P.R. 00908

[22] Filed: Dec. 18, 1970

[21] Appl. No.: 99,464

[52] U.S. Cl. ............................................. 33/126.7
[51] Int. Cl. ............................................. G01f 23/04
[58] Field of Search ........................... 33/126.6, 126.7

[56] References Cited

UNITED STATES PATENTS

| | | | |
|---|---|---|---|
| 1,851,195 | 3/1932 | Leilich | 33/126.6 |
| 1,237,735 | 8/1917 | Wright | 33/126.6 |
| 871,124 | 11/1907 | Knoblock et al. | 33/126.6 |
| 2,704,401 | 3/1955 | Mohr et al. | 33/126.6 |
| 2,754,596 | 7/1956 | O'Brien | 33/126.6 |
| 3,405,388 | 10/1968 | Byrhe | 33/126.6 X |
| 2,134,025 | 10/1938 | Bredown | 33/126.6 |

Primary Examiner—William D. Martin, Jr.
Attorney—Scrivener, Parker, Scrivener & Clarke

[57] ABSTRACT

The volume of solid or liquid material in a containing vessel or tank of any size or shape is indicated at a near or remote point by apparatus comprising a motor-operated reel mounted on the top of the vessel and having a cable wound on it carrying at its end a limit switch which is lowered into the vessel and is connected in circuit with the motor to stop rotation of the reel on contact with the upper surface of the contents of the vessel. A screw shaft rotates with the reel and carries a non-rotatable nut the extent of travel of which along the screw shaft is proportional to the depth through which the limit switch travels until it contacts the upper surface of the material. Means are provided for translating the extent of movement of the limit switch and nut into an indication of the volume of material in the vessel.

2 Claims, 3 Drawing Figures

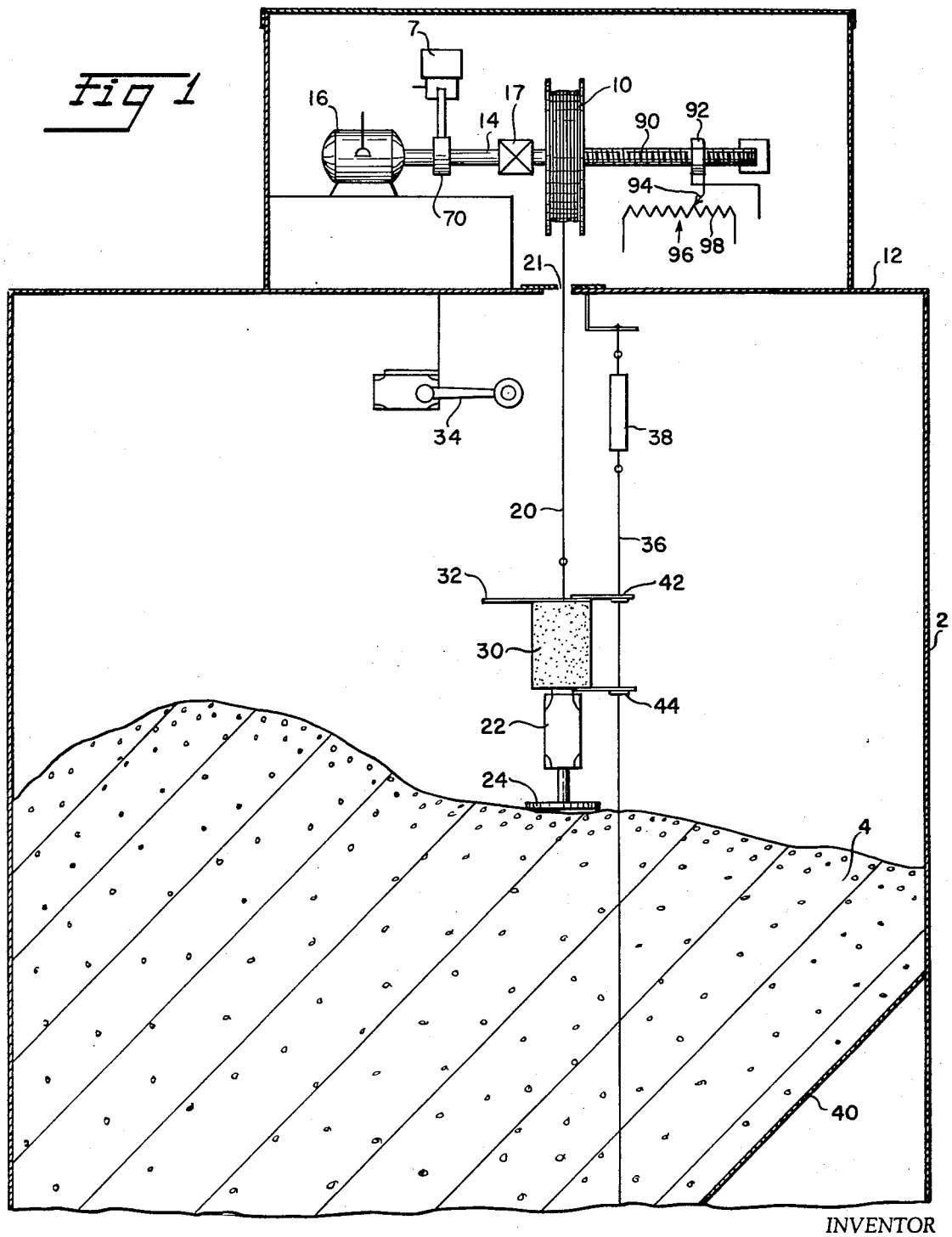

INVENTOR
JOSE E. BENGOA

BY
Scrivener Parker Scrivener & Clarke
ATTORNEYS

APPARATUS FOR INDICATING THE VOLUME OF MATERIAL IN A VESSEL OR TANK

DESCRIPTION OF THE DRAWINGS

FIG. 1 is a vertical sectional view through a containing vessel showing the means provided by the invention for indicating the volume of material in the vessel;

FIG. 1 is a circuit diagram of the indicating system; and

DESCRIPTION OF THE INVENTION

Figure 3:
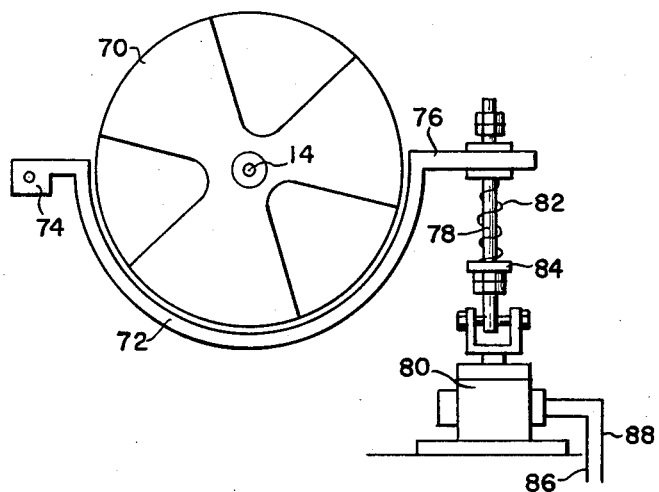
FIG. 3 is a detail view of the solenoid operated brake means for the reel shaft.

A preferred form of the measuring apparatus provided by my invention is disclosed in the drawings in association with a tank or vessel 2 which contains any solid or liquid material 4 the volume of which is to be measured. The tank may be of any size, height, or cross-sectional area or shape, as the apparatus may, by proper initial calibration, be adjusted to the variable dimensions of the tank with which it is designed to operate.

Figure 2:
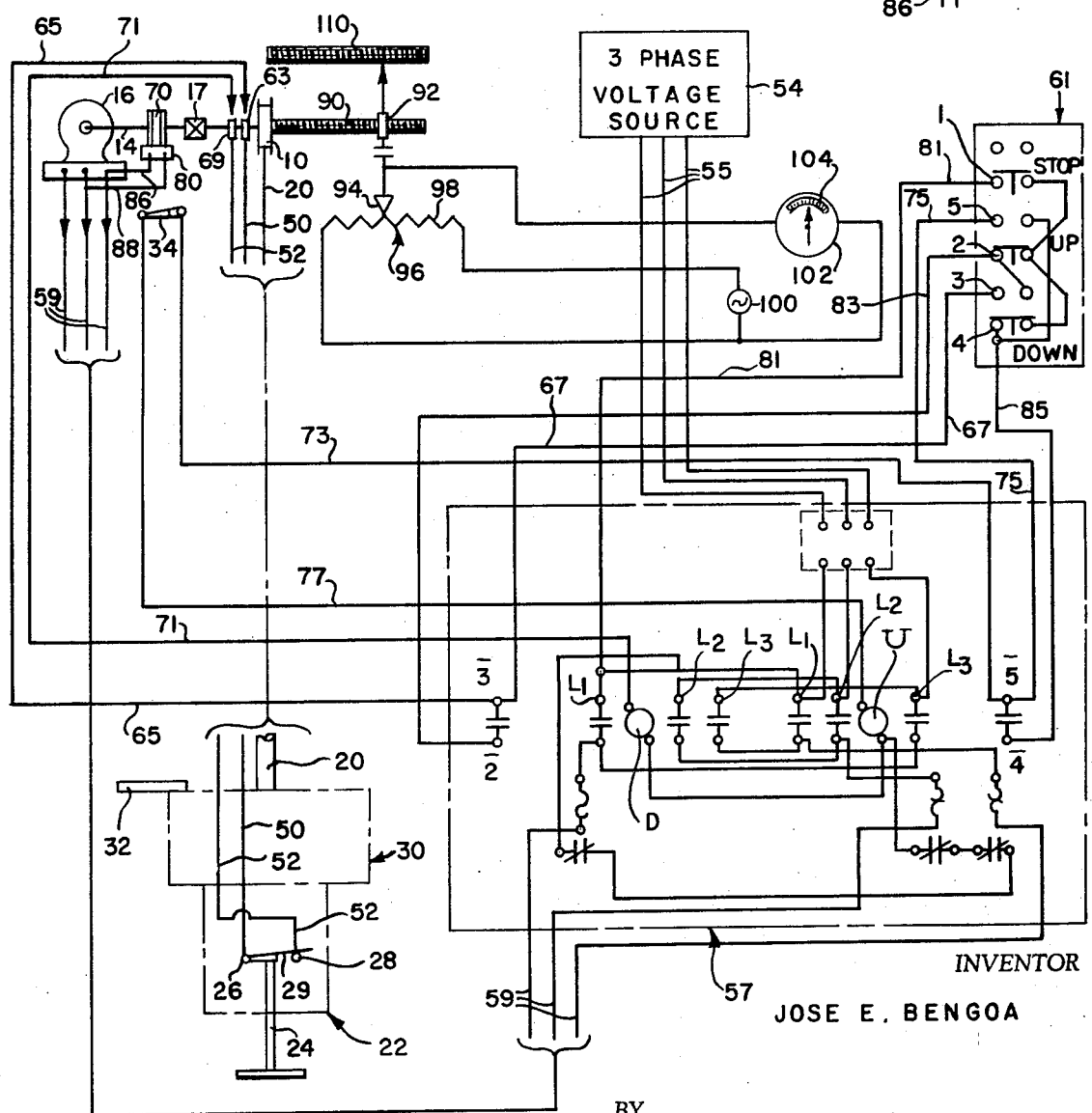

The measuring and indicating apparatus comprises, first, a reel 10 which is mounted on or adjacent the top surface 12 of the tank on the rotatable horizontal shaft 14 of a reversible electric motor 16 through reduction gearing 17. The reel has wound on it a cable 20 which depends from the reel into the tank, passing through opening 21 in cover 12, and has on its lower end an electrical sensing device 22 having a vertically floating contact member 24 extending downwardly therefrom. In the preferred embodiment being described the sensing device takes the form of a limit switch having contacts 26, 28 which, as shown particularly in FIG. 2, are bridged by conductive part 29 of the contact member 24 during downward movement of the cable and the parts connected thereto. A weighted ballast member 30 is also suspended on the cable and is positioned just above the sensing device 22, and a contact plate 32 is positioned just above the ballast member and extends laterally therefrom to engage a second normally closed limit switch device 34 which is positioned in or adjacent the cover 12 of the tank for a reason and having a function which will be described. A vertical guide-wire 36, including a turnbuckle 38, is suspended within the tank between the tank cover 12 and bottom 40, and passes through eyelets 42, 44 on the moving assembly of sensing device and ballast member to provide guidance and stability to the assembly as it is moved up and down by the cable. It will be apparent that operation of the motor 16 will cause rotation of the reel 10 with consequent up or down movement of the sensing device depending on the direction of rotation of the motor.

Referring now to FIG. 2, the three-phase reversible motor 16 is energized by the three-phase voltage source 54 through line conductors 55, the magnetic reversing-starting motor control means 57, and the phase conductors 59. The reversing-starting motor control means 57, which includes one or more remote momentary contact pushbutton stations 61, is of conventional design (for example, the General Electric Three Phase Magnetic Reversing Starter, Model No. C R 109) and forms, per se, no part of the present invention.

The stationary contact 26 of the lower limit switch 22 is connected with the terminal $\overline{3}$ of the remote pushbutton station 61 through conductor 50, slip ring 63 on shaft 14, conductor 65, internal terminal connection $\overline{3}$ of reversing-starting means 57, and conductor 67. The other stationary limit switch contact 28 is connected with "down" holding coil D of the motor control 57 through conductor 52, slip ring 69, and conductor 71. Finally, one contact of the upper limit switch 34 is connected with terminal $\overline{5}$ of the pushbutton station 61 through conductor 73, internal terminal $\overline{5}$ of the motor control means, and conductor 75. The other contact of the upper limit switch 34 is connected with the "up" holding coil U of the motor control means through conductor 77. The remaining terminals $\overline{1}$, $\overline{2}$ and $\overline{4}$ of the pushbutton station 61 are connected with the corresponding terminals of the motor control means through conductors 81, 83 and 85, respectively. It will be seen that operation of the pushbutton means 61 will operate motor 16 to cause the cable and its associated parts to be lowered in the tank, and that during downward movement of these parts the contact member 24 will be held by gravity in such a position that its upper transverse part 29 will bridge the contacts 26, 28 to complete the energizing circuit of motor 16, and that upon engagement of contact member 24 with the upper surface of the material in the tank it will be lifted from engagement with the contacts, breaking the motor energizing circuit. The motor control means 57 may now be operated to reverse the direction of rotation of the motor in order to wind the cable on reel 10 and raise the sensing device and associated parts, including contact member 32. When this contact member engages the normally closed upper limit switch 34 at or adjacent the cover 12, the switch will be moved to open position thereby opening the motor energizing circuit and stopping the motor and reel.

I have found that when either of the two limit switches 22 or 34 is operated the momentum of the moving parts will cause the cable reel to continue to move for a small interval of time, thus introducing an error into the indication provided by the apparatus, and means are therefore provided by the invention for immediately stopping rotation of the reel upon operation of either of the limit switches. Referring to FIG. 3, such means comprise, first, a brake drum 70 which is mounted on the motor and reel shaft 14 to rotate therewith, and a brake shoe 72 which partially surrounds the drum and is pivotally supported at its one end at 74. At its other end the shoe is provided with an outwardly extending arm 76 to which there is connected a rod 78 which forms, or is connected to, the armature of a solenoid 80 which, when energized from the motor supply conductors 59 through leads 86 and 88, maintains the brake shoe out of engagement with the brake drum. A compression spring 82 surrounds the rod 78 and bears on the arm 76 at its one end and on an abutment 84 at its other and constantly urges the brake shoe to drum-engaging position. It will be apparent that once the motor 16 is energized, the solenoid 80 is simultaneously energized to retract the brake shoe 72, and when the motor is de-energized, the solenoid 80 is also de-energized to move the brake shoe into engagement with brake drum 70 to immediately stop rotation of motor shaft 14 and the motor and reel.

Means are provided by the invention for indicating the extent of downward movement of the contact member 24 of sensing device 22 within the tank until it engages the upper surface of the material 4 within the tank, thereby to indicate the volume of such material. It will be understood that the initial calibration of the apparatus will take into account the vertical contours, the cross sectional size and shape, and other parameters of the tank so that the volume of material in the tank may be directly read. The indicating means comprise, first, a threaded shaft 90 which is connected to reel 10 for rotation therewith and which preferably forms a continuation of motor shaft 14 on which the reel is mounted. A nut 92 is threaded to shaft 90 and is held from rotation by any shaft is rotated. The nut carries the sliding contact 94 of a potentiometer 96 including resistor 98, the terminals of which are connected across a source of electrical energy 100. A voltmeter 102 is connected between the sliding contact 94 and one terminal of the source 100. It will be seen that rotation of screw shaft 90 will cause nut 92 to travel along the shaft until rotation is stopped by engagement of contact member 24 of limit switch 22 with the upper surface of the material in the tank. Thus, the limit of travel of the nut and of the sliding potentiometer contact carried thereby will be determined by the limit of downward travel of the sensing device 22 in the tank, and the resultant reading of voltmeter 102 will be an indication of the extent of such downward travel. The voltmeter scale 104 may be calibrated in cubic measure to provide a direct reading of the volume of material in the tank.

While the potentiometer circuit is a preferred way of providing the volumetric indication, other ways of doing this are within the scope of the invention. For example, as shown in FIG. 2, a scale 110 calibrated in volumetric measure may be associated with the movable nut 92 on screw shaft 90 to provide a direct reading from the position of the nut.

The operation of the indicating apparatus provided by the invention will be apparent to those skilled in the pertinent arts. The cable 20 is normally wound on reel 10 with the sensing device raised and its arm 32 in contact with limit switch 34, the solenoid 80 de-energized and the brake 70, 72 operative to hold shaft 14 from rotation, and nut 42 and potentiometer contact 94 in their most retracted position. If it is now desired to measure the volume of material in the tank the motor is energized to rotate motor-reel shaft 14 and threaded shaft 90 whereupon the sensing device 22, 24 begins its descent and the nut 92 and the potentiometer contact 94 begin their travel along threaded shaft 90. These movements continue until contact member 24 engages the upper surface of the material in the tank, whereupon the motor circuit is opened at 26, 28 stopping the rotation of the motor, reel, threaded shaft, nut and potentiometer pointer. The material volume may now be read from the scale of voltmeter 102 or from the scale 110 which is directly associated with traveling nut 92.

The provision of reduction gearing 17 between motor 16 and reel 10 permits reduction of the speed of rotation of the reel and consequent reduction of the speed of descent and ascent of the sensing device to speed levels which are manageable and desirable, and at which there is no excessive momentum of the descending parts which might cause overtravel.

It will be apparent that by the use of suitable and conventional selector switches any number of tanks may be monitored at a central location, which may be remote from some or all of the tanks, and at which there may be one or more reading scales.

The apparatus may be used to measure the volume of any solid or liquid in a tank or vessel, a contact plate such as plate 24 being used if solids are to be measured and a float if the material is a liquid.

It will be apparent that the basic problem of volume indication is solved by the provision of scale 110 at the location of the screw 90 and traveling nut 92. However, this scale provides only a local reading at the tank being monitored and is therefore only a part of the indicating means provided within the broad scope of the invention, which includes indicating means at a station or any number of desired stations remote from the tank or tanks being monitored. Thus, the provision of the voltmeter 104 and its associated parts and circuits constitute one of the most important goals and results of the invention as they permit the transmission of the volumetric indication from one or more tanks to any number of central monitoring locations.

I claim:

1. Apparatus for providing an indication of the volume of material within a containing vessel, comprising a rotatable reel mounted adjacent the top of the vessel, a cable wound on the reel and depending into the vessel and having a limit switch at its lower end adapted to be lowered into contact with the upper surface of material within the vessel as the cable is unwound from the reel, a reversing electric motor for rotating the reel in directions to raise and lower the cable within the vessel, a screw shaft connected to the reel for rotation therewith, means for causing the limit switch to de-energize the motor on contact of the limit switch with the upper surface of the material in the vessel, a brake on the shaft of the electric motor which is spring pressed to operating condition and is retracted to inoperative condition by a solenoid which is in circuit with the limit switch, means operable during descending travel of the limit switch to de-energize the brake, means operable on engagement of the limit switch with the upper surface of the material in the vessel to operate the brake to stop rotation of the motor, a non-rotatable nut threaded on the screw shaft for movement along its length as the screw shaft is rotated, whereby the extent of movement of the nut along the screw shaft is proportional to the movement of the limit switch from a starting position in which the limit switch is fully retracted from the upper surface of the material in the vessel to a position in which the limit switch is in contact with the upper surface of the material in the vessel, and means for indicating the extent of travel of the nut along the screw shaft thereby to indicate the volume of material in the container.

2. Apparatus according to claim 1, comprising in addition means for reducing the speed of rotation of the reel.

* * * * *